United States Patent
Hodgson

(10) Patent No.: US 6,516,610 B2
(45) Date of Patent: Feb. 11, 2003

(54) DEVICE FOR REDUCING A LEVEL OF NITROGEN OXIDES IN AN EXHAUST GAS OF AN INTERNAL COMBUSTION ENGINE

(75) Inventor: Jan Hodgson, Troisdorf (DE)

(73) Assignee: Emitec Gesellschaft für Emissionstechnologies mbH, Lohmar (DE)

( * ) Notice: Subject to any disclaimer, the term of this patent is extended or adjusted under 35 U.S.C. 154(b) by 0 days.

(21) Appl. No.: 10/078,143

(22) Filed: Feb. 19, 2002

(65) Prior Publication Data

US 2002/0108368 A1 Aug. 15, 2002

Related U.S. Application Data

(63) Continuation of application No. PCT/EP00/07832, filed on Aug. 11, 2000.

(30) Foreign Application Priority Data

Aug. 17, 1999 (DE) .......................................... 199 38 854

(51) Int. Cl.[7] ................................................ F01N 3/00
(52) U.S. Cl. ............................ 60/286; 60/295; 60/296; 60/303; 422/172; 422/176
(58) Field of Search .......................... 60/286, 295, 296, 60/299, 301, 303; 422/172, 176, 182, 183

(56) References Cited

U.S. PATENT DOCUMENTS

| | | | |
|---|---|---|---|
| 4,393,031 A | * 7/1983 | Henke | ......................... 423/239 |
| 5,150,573 A | * 9/1992 | Maus et al. | ..................... 60/299 |
| 5,165,452 A | 11/1992 | Cheng | |
| 5,209,062 A | * 5/1993 | Vollenweider | ............... 60/280 |
| 5,506,028 A | 4/1996 | Brück | |
| 6,203,770 B1 | * 3/2001 | Peter-Hoblyn et al. | ...... 432/212 |
| 6,302,683 B1 | * 10/2001 | Vestin et al. | ..................... 431/7 |
| 6,401,449 B1 | * 6/2002 | Hofmann et al. | .............. 60/274 |

FOREIGN PATENT DOCUMENTS

| | | |
|---|---|---|
| DE | 89 08 738.0 U1 | 10/1989 |
| DE | 42 03 807 A1 | 8/1993 |
| DE | 297 08 591 U1 | 8/1997 |
| DE | 197 31 926 C1 | 1/1999 |
| EP | 0 487 886 A1 | 6/1992 |
| EP | 0 555 746 A1 | 8/1993 |
| EP | 0 918 146 A1 | 5/1999 |
| TW | 247 340 | 5/1995 |
| TW | 258 290 | 9/1995 |
| TW | 341 618 | 10/1998 |
| WO | WO 89/02978 | 4/1989 |
| WO | WO 93/00990 | 1/1993 |
| WO | WO 93/20339 | 10/1993 |

* cited by examiner

Primary Examiner—Thomas Denion
Assistant Examiner—Binh Tran
(74) Attorney, Agent, or Firm—Laurence A. Greenberg; Werner H. Stemer; Ralph E. Locher

(57) ABSTRACT

A device is configured to catalytically reduce internal combustion engine exhaust gases which contain nitrogen oxides. The device has an exhaust pipe, one end of which can be connected to at least one exhaust outlet of the internal combustion engine. A reducing agent, in particular urea, is introduced into the exhaust pipe with a feed device. At least one mixer is arranged downstream of the reducing agent injection, as seen in the flow direction of the exhaust gas. The mixer has a multiplicity of passages through which the fluid can flow. At least one catalytic converter is arranged downstream of the mixer. At least one diffuser is located between the mixer and the converter. The diffuser which has a multiplicity of passages through which the exhaust gas can flow and which have a cross section which increases in the flow direction.

11 Claims, 5 Drawing Sheets

DEVICE FOR REDUCING A LEVEL OF NITROGEN OXIDES IN AN EXHAUST GAS OF AN INTERNAL COMBUSTION ENGINE

CROSS-REFERENCE TO RELATED APPLICATIONS

This application is a continuation of copending International Application No. PCT/EP00/07832, filed Aug. 11, 2000, which designated the United States.

BACKGROUND OF THE INVENTION

FIELD OF THE INVENTION

The subject matter of the present invention relates to a device for catalytically reducing nitrogen oxide ($NO_x$) in the cooling exhaust gases of an internal combustion engine.

When hydrocarbons are burned in an internal combustion engine, such as, for example, in a diesel engine or a spark-ignition engine, not only are the principal combustion products of carbon dioxide and steam formed, but also byproducts, some of which are undesirable. These undesirable byproducts may be nitrogen oxides. The level of nitrogen oxides is dependent not only on the way in which the combustion is carried out but also on the air/fuel ratio. If there are sub-stoichiometric amounts of air, the exhaust gas contains relatively large amounts of carbon dioxide and hydrocarbons. If there is an excess of air the carbon dioxide and the hydrocarbons are almost completely oxidized. The level of nitrogen oxides in an exhaust gas experiences a maximum in the range of a slightly lean mixture composition. However, for internal combustion engines, in particular for spark-ignition engines, an optimum of the specific consumption lies in this range. Therefore, if, in particular, spark-ignition engines are set for an optimally low consumption, it is also possible for the exhaust gas to contain high $NO_x$ concentrations.

To reduce the $NO_x$ content in an exhaust gas originating from an internal combustion engine, it has become known, for example, from published European application EP 0 487 886 A1 that the selective catalytic reduction of $NO_x$ in oxygen-containing exhaust gases is possible using urea and a reducing catalyst. Before it comes into contact with the reducing catalyst, which may form a catalytic converter, the urea is quantitatively hydrolyzed to form ammonia and carbon dioxide. The use of urea has the advantage that there is no need to carry ammonia in motor vehicles and to provide ammonia, which would require appropriate safety precautions.

A problem with the use of urea as reducing agent is that if urea is injected directly upstream of the catalytic converter, undesirable reaction products may form. It is possible for solids to form during the thermolysis of the urea.

To avoid this problem, published German patent application DE 42 03 807 A1 proposes a device for the catalytic reduction of exhaust gases of an internal combustion engine which contain nitrogen oxides. The device has a catalytic converter and a feed device which sprays the liquid urea in finely dispersed form onto a vaporizer that is disposed upstream of the catalytic converter in the prevalent flow direction.

The vaporizer is designed as a flow mixer, with the object that the efficiency of urea decomposition is to be increased. The vaporizer which is designed as a flow mixer and is referred to below as a "mixer", according to DE 42 03 807 A1, is preferably to be designed in such a way that turbulence and radial and/or tangential flow components are generated inside the mixer, so that the heat transfer to the urea solution is completed as quickly and as fully as possible. Furthermore, the intention is to bring about the most uniform possible dispersion of the urea solution and of the gases formed therefrom over the entire cross section of the vaporizer and a hydrolysis catalyst downstream of the vaporizer.

The exhaust gas containing fluid leaving the hydrolysis catalyst, from the internal combustion engine, and ammonia and carbon dioxide are fed to a catalytic converter in which, inter alia, the reduction of nitrogen oxides takes place.

SUMMARY OF THE INVENTION

The object of the invention is to provide a device for reducing the nitrogen oxide content in the exhaust gas of an internal combustion engine which overcomes the above-noted deficiencies and disadvantages of the prior art devices and methods of this general kind, and which increases the efficiency of the device for the catalytic reduction of exhaust gases from an internal combustion engine which contain nitrogen oxides still further.

With the above and other objects in view there is provided, in accordance with the invention, a device for catalytically reducing $NO_x$-containing exhaust gases of an internal combustion engine, comprising:

an exhaust pipe for receiving and conducting exhaust gas of an internal combustion engine in a given flow direction;

a feed device communicating with the exhaust pipe for introducing a reducing agent, such as urea, into the exhaust pipe;

at least one mixer disposed downstream of a point at which the reducing agent is fed into the exhaust pipe in the given flow direction, the mixer being formed with a multiplicity of flow passages;

at least one catalytic converter disposed downstream of the mixer in the given flow direction; and a diffuser disposed between the mixer and the catalytic converter, the diffuser being formed with a multiplicity of passages through which the exhaust gas can flow, the passages of the diffuser having a cross section increasing in the given flow direction.

In other words, the device according to the invention for the catalytic reduction of $NO_x$-containing exhaust gases from an internal combustion engine has an exhaust pipe, one end of which can be connected to at least one exhaust outlet from an internal combustion engine. A feed device is provided, by means of which a reducing agent, in particular urea, can be introduced into the exhaust pipe. Furthermore, the device has at least one mixer which is arranged downstream of the point where the reducing agent is fed into the exhaust pipe, as seen in the direction of flow of the exhaust gas, this mixer having a multiplicity of passages through which the fluid can flow. At least one catalytic converter is arranged downstream of the at least one mixer. The device according to the invention is distinguished by the fact that between the mixer and the converter there is at least one diffuser which has a multiplicity of passages through which the exhaust gas can flow and which have a cross section which increases in the direction of flow.

This inventive configuration of the device ensures that the fluid leaving the at least one mixer, which contains the internal combustion engine exhaust gas and the decomposition products formed from the reducing agent—in particular ammonia and carbon dioxide—is transferred uniformly into the catalytic converter. This ensures that the fluid flows onto the catalytic converter relatively uniformly over its entire cross section, so that the catalytic converter is uniformly utilized.

By means of the diffuser, which has a multiplicity of passages through which the exhaust gas can flow and which have a cross section which increases in the direction of flow, it is possible to disperse the fluid very uniformly over the entire entry side of the catalytic converter. The pressure drops in the diffuser are relatively low.

In accordance with an added feature of the invention, the mixer has an outlet with a defined cross section and the diffuser has an inlet with a free cross section of flow at least as large as the cross section of the outlet of the mixer. This ensures that the pressure drops in the transitional region between the mixer and the diffuser are relatively low.

In accordance with an additional feature of the invention, the diffuser at the inlet has a cell density which corresponds to a cell density of the mixer. In this way, further pressure drops are avoided. Cell density is defined as the number of passages per cross-section unit area.

In accordance with another feature of the invention, a cross-sectional shape of the passages of the diffuser at an inlet of the diffuser corresponds substantially to a cross-sectional shape of the passages at an outlet of the mixer.

In accordance with a further feature of the invention, at least some of the passages at the inlet of the diffuser are aligned with corresponding the passages at the outlet of the mixer.

In other words, the cross-sectional shape of the individual passages at the entry to the diffuser corresponds substantially to the cross-sectional shape of the individual passages of the mixer at the exit. Preferably, at least some of the individual passages of the diffuser at the entry are aligned with some of the individual passages of the mixer at the exit. This arrangement and design of the mixer and the diffuser ensures that the passage of the mixer merges, as it were, into the passage of the diffuser. As a result, pressure drops in the transitional region between diffuser and mixer are reduced still further.

To improve the mixing of the urea with the exhaust gas still further, it is proposed for the passages of the diffuser to be offset with respect to the passages of the mixer at the exit. As a result, a filament of flow which emerges from a passage of the mixer is broken up into a plurality of partial flows at the entry to the diffuser. These partial flows are mixed with further partial flows which are formed by splitting other filaments of flow which emerge from the mixer.

Since the passages inside the diffuser increase in size in the direction of flow, it is also ensured that the diffuser has a certain mixing action on the fluid inside a passage, since the flow velocity inside the diffuser is reduced, so that the ratio between flow velocity and diffusion rate shifts in the direction of the diffusion rate.

In accordance with again an added feature of the invention, the diffuser is formed with a jacket casing and at least one stack of smooth and undulating sheet-metal layers which are layered on top of one another. The configuration of the diffuser may correspond to the diffuser structure disclosed in the international PCT publication WO 89/02978 or the publication WO 93/20339. The disclosures of those publications is herewith incorporated by reference.

To increase the mixing of the fluid still further, it is proposed, according to yet another advantageous configuration, for at least some of the passages of the diffuser to be connected to one another in terms of flow.

The passages of the diffuser are delimited by passage walls. Preferably, at least some of the passage walls have openings. In particular, it is proposed for at least some of the openings to be assigned guide surfaces which run obliquely with respect to the passage wall. These guide surfaces divert the flow from one passage into an adjacent passage.

To achieve the quickest possible mixing of the fluid in the radial direction of the diffuser, it is proposed for smooth sheet-metal layers, which are at least partially of mesh-like design, to be provided between undulating sheet-metal layers. The smooth sheet-metal layers may be formed by an expanded metal.

In accordance with a concomitant feature of the invention, the diffuser is disposed substantially directly and immediately behind the mixer.

Other features which are considered as characteristic for the invention are set forth in the appended claims.

Although the invention is illustrated and described herein as embodied in a device for reducing the level of nitrogen oxides in an exhaust gas from an internal combustion engine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
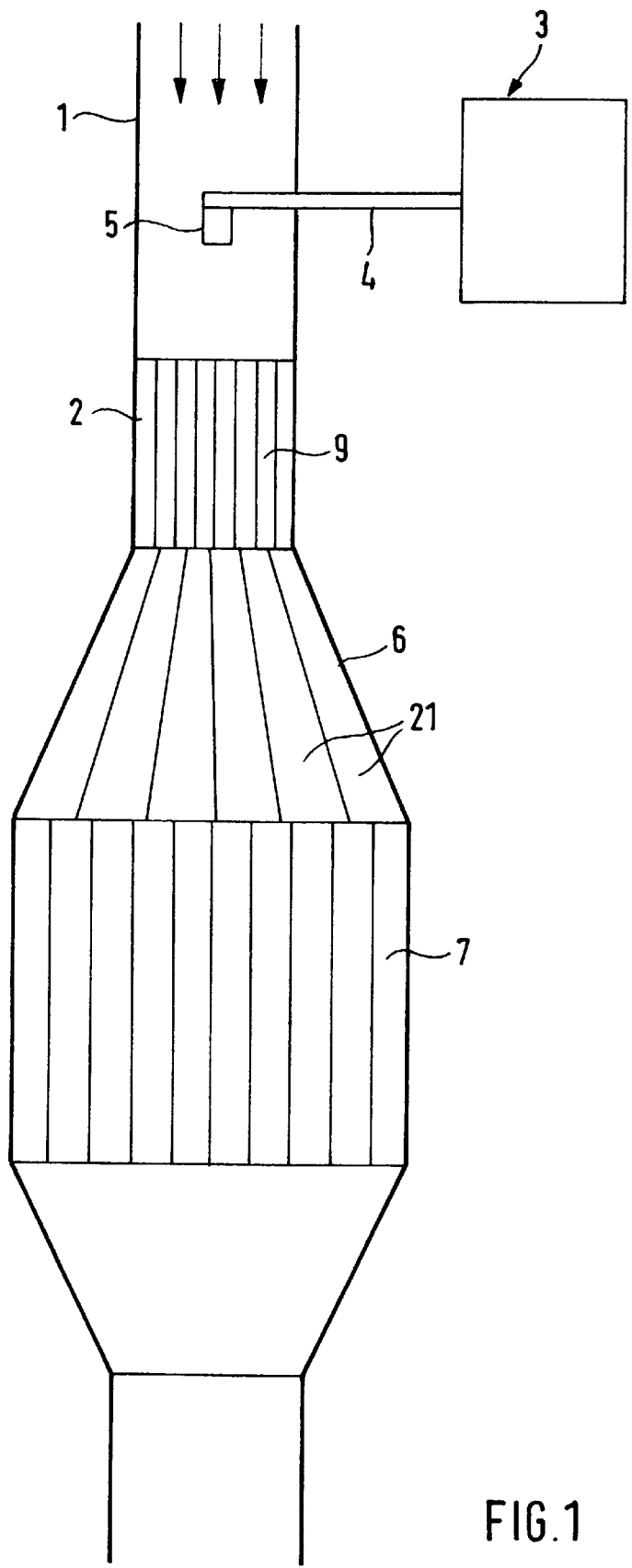
FIG. 1 is a diagrammatic view of a device for the catalytic reduction of exhaust gas from an internal combustion engine which contains nitrogen oxides.

Referring now to the figures of the drawing in detail and first, particularly, to FIG. 1 thereof, there is seen a device for the catalytic reduction of $NO_x$-containing exhaust gases from an internal combustion engine. The device has an exhaust pipe 1, one end of which can be connected to at least one exhaust outlet from an internal combustion engine. The flow direction of the exhaust gas inside the exhaust pipe 1 is indicated by arrows.

A reducing agent, in particular urea, can be introduced into the exhaust pipe 1 with a feed device 3. The feed device has a feed line 4 which projects into the exhaust pipe. A nozzle 5, in particular a spray nozzle, is arranged at the free end of the line 4.

A mixer 2 is arranged inside the exhaust pipe 1. The mixer 2 is arranged downstream of the feed device for the reducing agent in the flow direction of the exhaust gas. The nozzle 5 is directed in such a way that it injects or sprays the reducing agent into the exhaust gas in the direction of flow of the exhaust gas.

The mixer 2 is formed with a multiplicity of passages 9 through which the fluid can flow. The number of passages per cross-sectional unit area is referred to as the cell density.

As illustrated in FIG. 1, a diffuser 6 directly adjoins the mixer 2. The diffuser 6 has a multiplicity of passages 21 through which the exhaust gas can flow and which have a cross section which increases in the flow direction.

A catalytic converter 7 is arranged downstream of the diffuser 6 in the flow direction. The converter 7 may also be formed by a plurality of partial converters which are arranged at a distance from one another.

Figure 2:
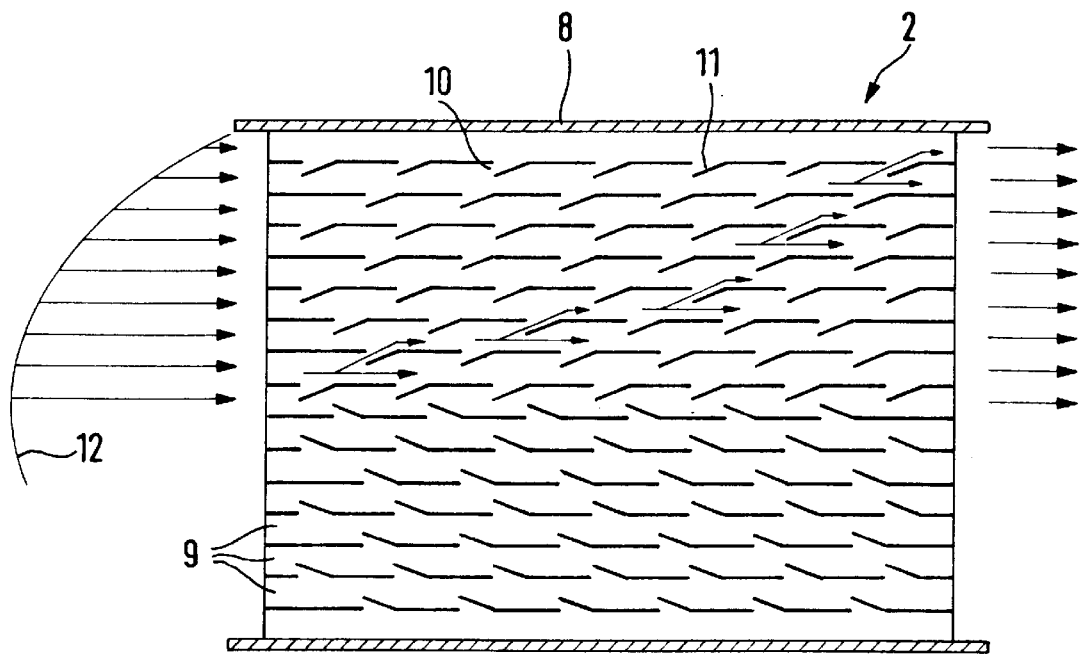
FIG. 2 is a longitudinal sectional view taken through a mixer.

Referring now to FIG. 2, there is seen a diagrammatic depiction of a longitudinal section through one embodiment of a mixer. The mixer 2 is formed by a plurality of metal sheets which are structured at least in some areas and delimit passages 9 through which the exhaust gas can flow. At least some of the passages 9 are provided with openings 10. The openings 10 are assigned guide surfaces which run obliquely with respect to the longitudinal axis of the mixer 2. On the outside, the mixer 2 is delimited by a jacket tube or casing pipe 8. The exhaust gas flowing inside the exhaust pipe 1 generally has a parabolic flow profile, so that not all the passages 9 receive the same volumetric flow rates. The distribution of the guide surfaces 11 which is diagrammatically indicated in the longitudinal section evens out the flow profile and therefore also evens out the components contained in the fluid, in that partial flows are constantly diverted from the inner passages, in which there is a high volumetric flow rate, into adjoining passages which lie further toward the outside and have a low volumetric flow rate.

Figure 3:
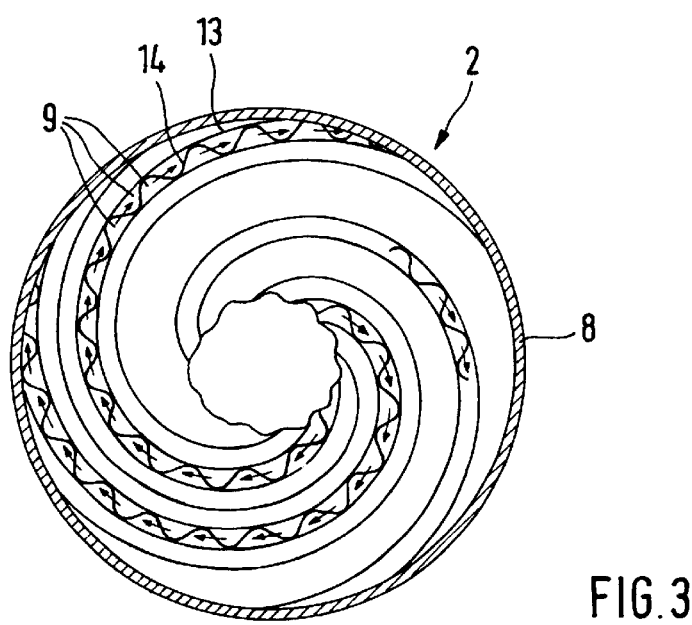
FIG. 3 is a front view of a mixer, with helically running sheet-metal layers.

Such a division of the flow can be achieved by means of a honeycomb body which, at least in the outer region, comprises layers of smooth metal sheets 13 and undulating metal sheets 14 which run approximately in the shape of an involute, as diagrammatically illustrated in FIG. 3. The arrows in FIG. 3 indicate that the flow is constantly partially branched off into adjacent passages 9 which lie further toward the outside, by means of openings and guide surfaces, with the result that the volumetric flow rates are evened out from the inside outward, thus also resulting in intimate mixing of the fluid.

Figure 4:
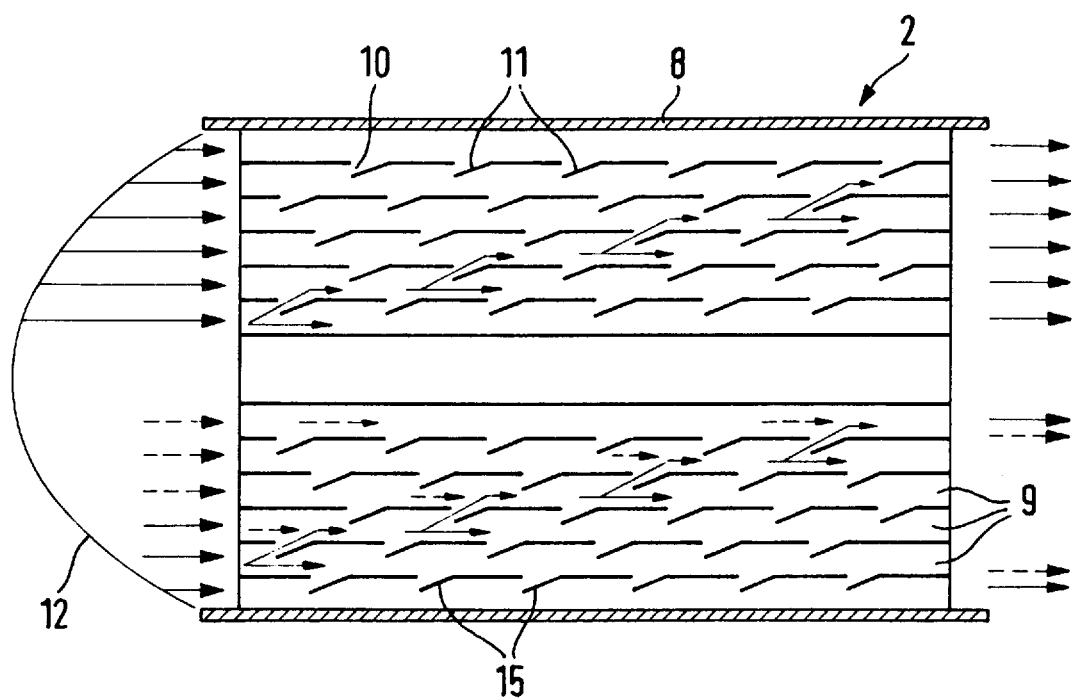
FIG. 4 is a longitudinal sectional view taken through a mixer with flow diversions, in some regions toward the outside and in some regions toward the inside.

FIG. 4 diagrammatically depicts a longitudinal section through another embodiment of a mixer 2. The mixer 2 has openings 10 and guide surfaces 11, 13. The mixer 2 produces particularly good mixing of the flow. The mixer 2 is formed by a metallic honeycomb body which is arranged in a casing pipe 8. A substantially parabolic flow profile 12 flows onto the mixer 2. The mixer has a multiplicity of passages 9.

In partial areas of the mixer 2, the guide surfaces 11 are directed in such a way that the partial flows of the volumetric flows are diverted from the inside outward. In other partial areas volumetric flows are diverted from the outside inward. This is indicated diagrammatically by the arrows in particular in the bottom part of the mixer 2.

Figure 5:
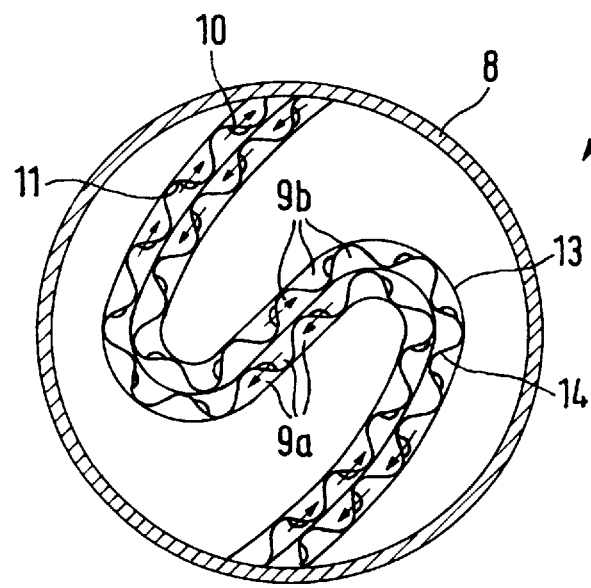
FIG. 5 is a front view of a mixer with S-shaped sheet-metal layers.

Referring now to the front view of a mixer 2 in FIG. 5, the mixer 2 is formed of sheet-metal layers which are bent in an S shape. The mixer has smooth sheet-metal layers 13 and corrugated or undulating sheet-metal layers 14 which are arranged in a stack. The ends of the stacks are twisted in opposite directions. Within the undulating sheet-metal layers 14, guide surfaces 11 and openings 10 are formed on different flanks and are differently oriented, so that, for example, in two adjacent layers of passages 9a, 9b differently directed partial flows are branched off.

Figure 6:
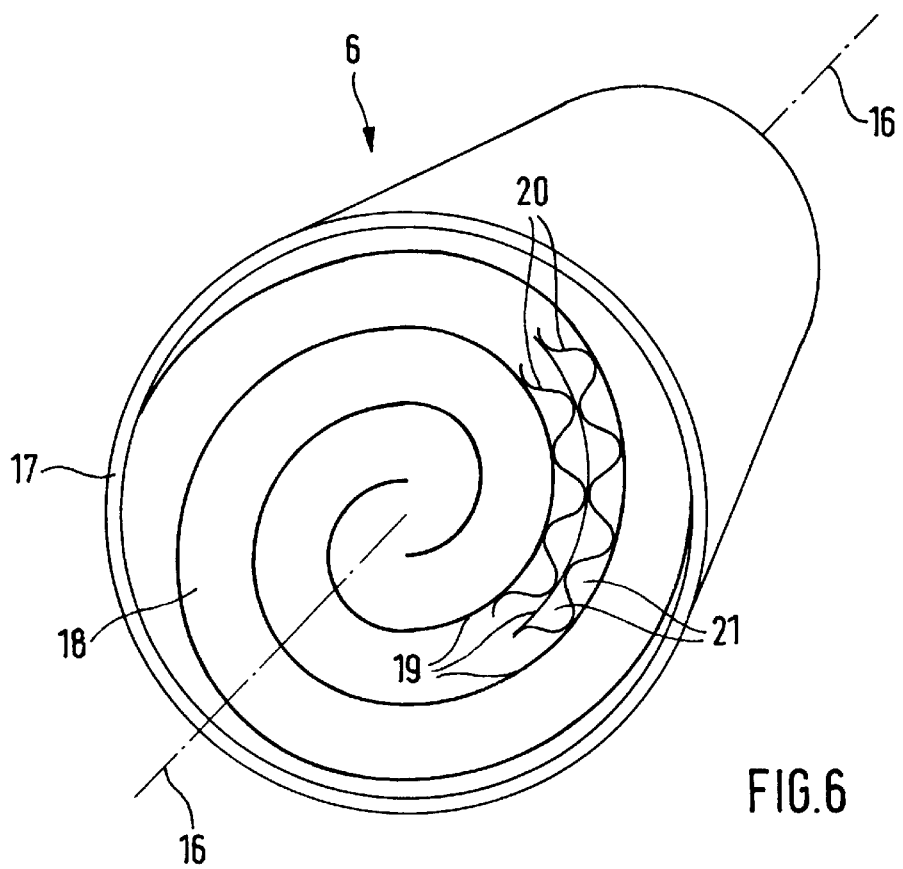
FIG. 6 is a perspective view of one embodiment of a diffuser.

FIG. 6 shows a perspective and diagrammatic view of one embodiment of a diffuser 6. The diffuser 6 has a conical shape with respect to an axis 16. It has a conical casing 17. A stack 18 which is twisted in an S shape is arranged inside the casing 17. The stack 18 comprises smooth metal sheets 19 and undulating metal sheets 20. The smooth metal sheets 19 and the undulating metal sheets 20 delimit passages 21 which have a cross section which increases in the direction of flow.

Reference is had, for details of the production and design of a diffuser of this type, to the PCT publication WO 93/20339.

Figure 7:
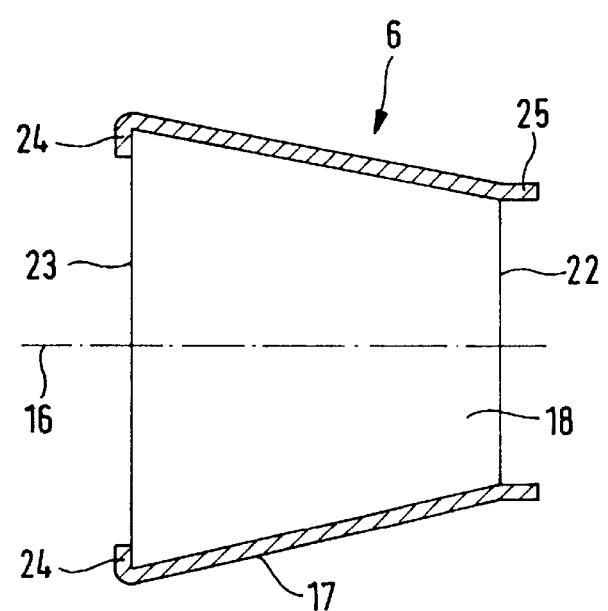
FIG. 7 is a diagrammatic sectional view of another embodiment of a diffuser.

FIG. 7 shows another embodiment of a diffuser 6. The diffuser 6 is formed by a casing 17 in which a stack 18 is arranged. The diffuser 6 has a conical shape. The inlet of the diffuser 6, i.e., the entry for a fluid, is denoted by reference numeral 22, and the outlet, i.e., the exit for the fluid, is denoted by the reference numeral 23. The stack 18 is held inside the casing 17 by an encircling collar 24. The collar 24 can be produced by flanging the casing 17. By means of the flange 25, which extends in the axial direction of the diffuser 6 and is formed on the inlet or entry side 22, the diffuser 6 can be connected to a mixer 2.

Figure 8:
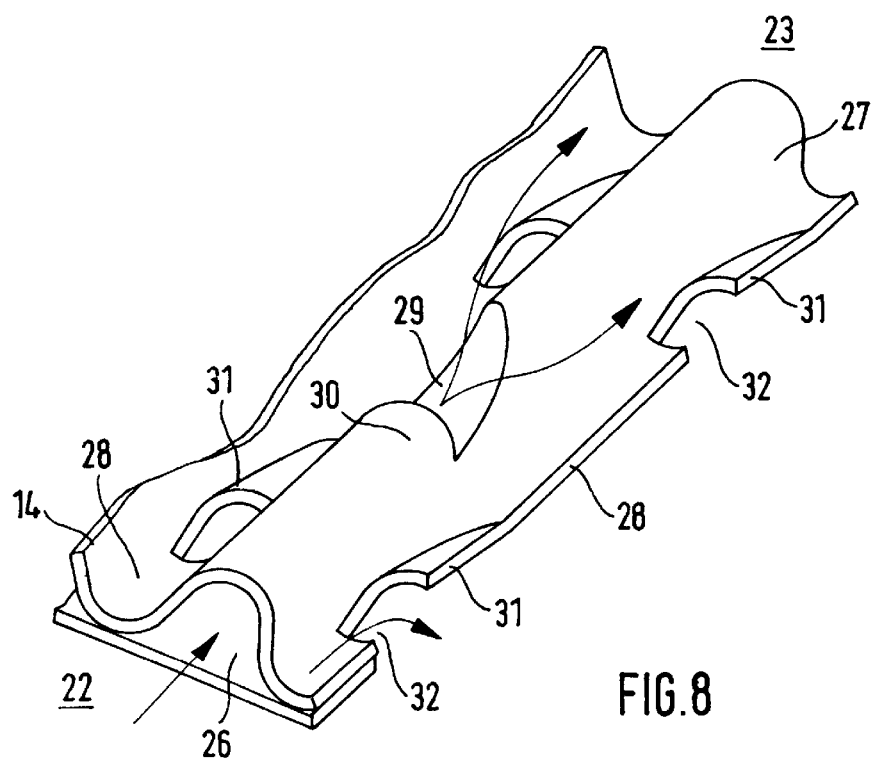
FIG. 8 is a diagrammatic perspective view of a portion of one embodiment of a sheet-metal layer, as is suitable for a mixer or a diffuser according to the invention.

If the diffuser 6 is to be used simultaneously as a flow mixer which allows the fluid to flow in the radial and/or tangential direction, it is proposed for the stack 18 to be designed in such a way that there are no continuous smooth metal sheets arranged between the undulating metal sheets. To provide the stack 18 with stability, it is proposed for a sheet-metal strip 26 to be arranged between adjacent undulating metal sheets 14 at the entry 22 and/or at the exit 23, as illustrated in FIG. 8. The sheet-metal strip extends over only part of the axial length of the diffuser 6. The sheet-metal layer 14 illustrated in FIG. 8 has an undulating wave with wave crests 27 and wave troughs 28. If a wave crest 27 is considered in the axial direction, it can be seen that the wave crest 27 has at least one deformation 29 which serves as a flow divider. It is shown that at the deformation 29 a flow of fluid is diverted into the adjacent wave troughs 28. Upstream of the deformation 29, the wave crest is provided, at 30, with an opening, so that a fluid which flows in at 22 flows out through the opening 30 and onto the deformation 29.

All the wave crests 27 or a plurality of selected wave crests 27 may be provided with deformations 29 and openings 30 of this nature. As seen in the axial direction, a wave crest may be provided with a plurality of deformations and openings arranged one behind the other.

FIG. 8 furthermore shows that stamped-out sections 31 with openings 32 are formed in the wave troughs 28. This design of the diffuser results in mixing in the circumferential direction and also mixing in the radial direction.

Figure 9:
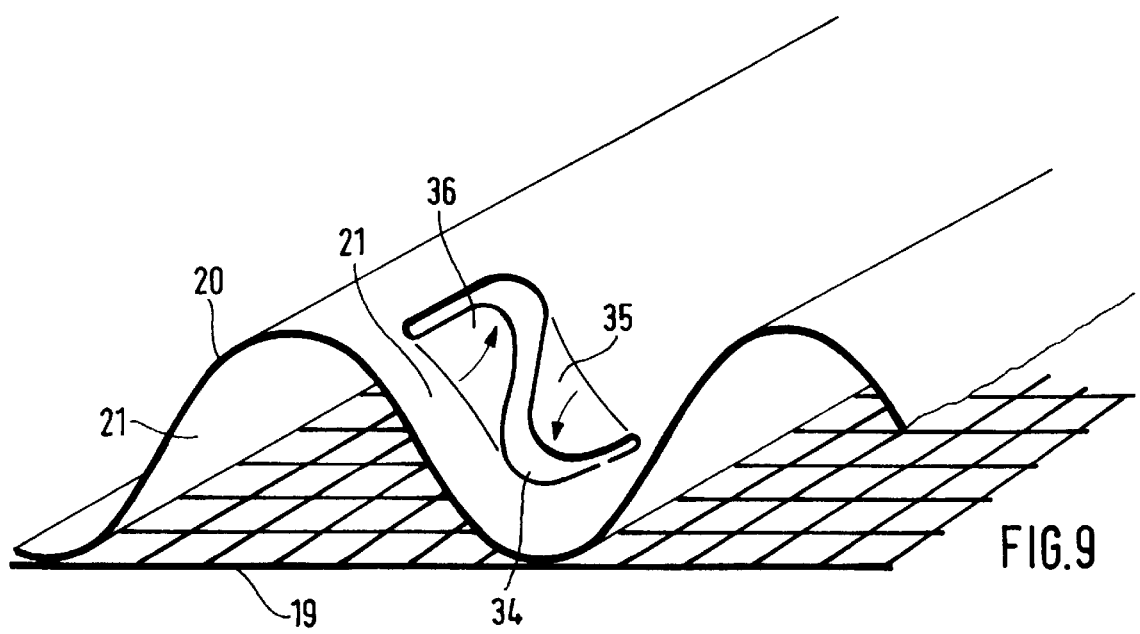
FIG. 9 is a diagrammatic view of a second exemplary embodiment of an undulating and smooth sheet-metal layer for a mixer or for a diffuser.

FIG. 9 shows yet another configuration of a smooth metal sheet 19 and an undulating metal sheet 20. The smooth metal sheet 19 is of mesh-like construction. Preferably, the smooth metal sheet 19 is an expanded metal.

The undulating metal sheet 20 has a slot 34. The slot 34 is illustrated diagrammatically. The slot 34 is preferably formed on the flanks of the wave crest 27. It is possible for a plurality of slots 34, formed one behind the other, to be present in the undulating metal sheet 20.

The slot 34 is partially delimited by two tabs 35, 36. The tabs 35, 36 are bent out of the plane of the undulating metal sheet 20. As a result, flow-guiding surfaces are formed, leading to a cross-flow between adjacent passages 21. The result is mixing in the circumferential direction of the diffuser 6. Mixing in the radial direction is brought about by means of the smooth metal sheet 19 which is of mesh-like construction.

I claim:

1. A device for catalytically reducing $NO_x$-containing exhaust gases of an internal combustion engine, comprising;
   - an exhaust pipe for receiving and conducting exhaust gas of an internal combustion engine in a given flow direction;
   - a feed device communicating with said exhaust pipe for introducing a reducing agent into said exhaust pipe;
   - at least one mixer disposed downstream of a point at which the reducing agent is fed into the exhaust pipe in the given flow direction, said mixer being formed with a multiplicity of flow passages;
   - at least one catalytic converter disposed downstream of said mixer in the given flow direction;
   - a diffuser disposed between said mixer and said catalytic converter, said diffuser being formed with a multiplicity of passages for conducting the exhaust gas, said passages of said diffuser having a cross section increasing in the given flow direction; and
   - wherein a cross-sectional shape of said passages of said diffuser at an inlet of said diffuser corresponds substantially to a cross-sectional shape of said passages at an outlet of said mixer.

2. The device according to claim 1, wherein said feed device is configured to feed urea as the reducing agent into said exhaust pipe.

3. The device according to claim 1, wherein said mixer has an outlet with a defined cross section and said diffuser has an inlet with a free cross section of flow at least as large as the cross section of the outlet of said mixer.

4. The device according to claim 3, wherein said diffuser at said inlet has a cell density corresponding to a cell density of said mixer.

5. The device according to claim 1, wherein at least some of said passages at said inlet of said diffuser are aligned with corresponding said passages at said outlet of said mixer.

6. The device according to claim 1, wherein said diffuser comprises a casing and at least one stack of smooth and undulating sheet-metal layers layered on top of one another and disposed in said casing.

7. The device according to claim 1, wherein at least some of said passages of said diffuser are configured to fluidically communicate with one another.

8. The device according to claim 7, wherein said passages are delimited by passage walls having openings formed therein, and wherein at least some of said openings are assigned guide surfaces extending obliquely to a respective said passage wall.

9. The device according to claim 7, wherein said channels of said diffuser are formed by a stack of alternating smooth and undulating sheet-metal layers and said smooth sheet metal layers are at least partially mesh-like layers.

10. The device according to claim 9, wherein said smooth sheet-metal layers are formed by an expanded metal.

11. The device according to claim 1, wherein said diffuser is disposed substantially immediately behind said mixer in the given flow direction.

\* \* \* \* \*